United States Patent [19]

Kamei et al.

[11] Patent Number: 5,528,698

[45] Date of Patent: Jun. 18, 1996

[54] AUTOMOTIVE OCCUPANT SENSING DEVICE

[75] Inventors: John H. Kamei, Chino Hills; Cathy L. Boon, Brea; Phillip F. Stevens, La Habra, all of Calif.

[73] Assignee: Rockwell International Corporation, Seal Beach, Calif.

[21] Appl. No.: 411,376

[22] Filed: Mar. 27, 1995

[51] Int. Cl.$^6$ ...................................................... G06K 9/00
[52] U.S. Cl. .......................... 382/100; 382/103; 382/104; 280/732; 280/735; 250/227.15
[58] Field of Search .................................. 280/732, 735; 250/227.15; 382/100, 103, 104; 348/143, 148

[56] References Cited

U.S. PATENT DOCUMENTS

| | | | |
|---|---|---|---|
| 4,988,862 | 1/1991 | Beltz | 250/227.15 |
| 5,232,243 | 8/1993 | Blackburn et al. | 280/732 |
| 5,330,226 | 7/1994 | Gentry et al. | 280/735 |

OTHER PUBLICATIONS

Ellen Berlin and Barry McCahill,, "DOT Proposes Air Bag Switch For Positions With Child Seats", U.S. Department of Transportation, Oct. 5, 1994, pp. 1–27.

Kim I. Mills, "AM–Babies–Airbags;550", Latimes Edit Pgs, Oct. 5, 1994, 2 pages.

Mark Siira, "Comments on NHTSA Notice of Proposed Rulemaking", Oct. 19, 1994, 3 pages; and Federal Register/ vol. 59, No. 194/Friday, Oct. 7, 1994/Proposed Rules, pp. 51158–51164.

"Feature/Surging Safety", Ward's Auto World, May 1994, p. 50.

Jerry Shine, "Caution: Air Bags At Work", Popular Science, Jun. 1994, p. 36.

Marjorie Sorge, "Parental warning: Air bags can kill kids", Ward's Auto World, May 1994, p. 43.

*Primary Examiner*—Jose L. Couso
*Assistant Examiner*—Anh Hong Do
*Attorney, Agent, or Firm*—George A. Montanye; David J. Arthur; Susie H. Oh

[57] ABSTRACT

A vehicle occupant safety system includes an image sensor and processor that provides a classification of the occupancy status of the passenger seat area to determine whether an airbag should be deployed. The image processing system includes a photodetector array sensor and lens assembly with image processing electronics to acquire a machine vision representation of the passenger seat area within a vehicle. The objects in the field of view are then discriminated to determine whether a rear-facing child carrier is located in the passenger seat, such that the passenger-side airbag can be disabled.

19 Claims, 6 Drawing Sheets

AUTOMOTIVE OCCUPANT SENSING DEVICE

BACKGROUND OF THE INVENTION

1. Field of the Invention

The present invention relates to in-vehicle imaging and sensing and, more particularly, to a device that determines whether a vehicle passenger seat is unoccupied, is occupied by a person, or is occupied by a child seated in a rear-facing child carrier.

2. Description of Related Art

As the needs and desires for automobile safety enhancement features increase, injuries attributable to such safety equipment and devices themselves are exacerbated. For example, automobile passenger-side inflatable restraints (airbags) in automobiles equipped with such supplemental safety devices are generally deployed upon a sufficiently severe impact of the front section of the vehicle. However, it has been found that rear-facing child carriers, i.e., where the restrained child faces the passenger seat back of the automobile, may be potentially hazardous, and possibly perilous, upon deployment of an airbag. Serious damage to the child restrained in a typical child carrier could occur when the airbag first deploys, shooting out at speeds up to 200 mph. As illustrated in FIG. 1, the inflating airbag 110 deploys over the top of the child seat 112 and transfers a force to the back of the seated child's head.

In addition to possible injury of the child due to the direct contact with the airbag, injuries could also occur to a child in a rear-facing child carrier if a deploying air bag pushes the child restraint 112 into the passenger seat back 114. Although it will be recognized that a safer mode of travel for a child in a child carrier is in the back seat of a vehicle, some vehicles do not have back seats (e.g., trucks and small sports cars), while in other vehicles the back seat may be unable to accommodate a child carrier.

Furthermore, in some vehicles which have small cab areas, such as compact pick-up trucks and sports cars, deploying may cause damage to the vehicle as well as injury to the driver if the vehicle windows are closed during an impact. In such instances, if both driver and passenger airbags deploy during impact, the side windows of the vehicle could be shattered and the eardrums of the driver ruptured due to the rapid air pressure increase in the small interior volume. Moreover, the replacement cost of a passenger airbag after deployment, which would otherwise not have been necessary due to the absence of such a passenger, may be substantial.

Thus, to increase child safety in a rear-facing child carrier, as well as to lower the cost of unnecessarily deployed airbags, a variety of detection technologies have been suggested. For example, manual override switches may be installed to allow a driver to disable the passenger-side airbag manually. Such devices, however, become ineffective in instances where the driver or operator simply forgets to turn the switch on or off depending upon the existence of a passenger or a child in a rear-facing child carrier in the automobile passenger seat. Even such enhancements as dashboard indicators or automatic reset arrangements would not be foolproof. If a driver transporting a child in a rear-facing child carrier makes frequent stops, the requirement that the driver continually manually reset the switch could be cumbersome.

Other safety-enhancement schemes for occupant detection include radar or ultrasonic technologies. Sensory devices which detect radar or sound waves may be installed in the dashboard or in the passenger seat itself. However, if the dashboard is blocked or the seat is covered, accurate detection of a passenger in the passenger seat would be hindered. Moreover, it has been found that consumers generally do not like the idea of "beams and waves" being directed at them. Consequently, such approaches are typically not preferred.

SUMMARY OF THE INVENTION

Accordingly, an object of the present invention is to provide an automotive occupant safety system to enhance the safety of occupant restraint systems in vehicles. A further object of the invention is to provide a communication and detection system in which airbag control electronics in a vehicle communicate with the present invention to determine the preferred airbag deployment depending on the occupancy status of the seating area.

In accordance with these and other objects, an occupant safety system in accordance with the present invention includes image processing technology in conjunction with other sensors, such as seat belt extension, vehicle speed, door open status, seat weighting, etc., to determine the preferred airbag deployment. In preferred embodiments, the image processing system generally comprises a phototransistor array sensor and lens assembly with image processing electronics to acquire a visual representation of the passenger seat area. The objects in the field of view are then discriminated to determine whether a person or a child in a rear-facing child carrier is present in the passenger seat.

The photodetector array principally acquires images based upon photon reception in the near-infrared and visible light spectrum. To operate in dark or uneven lighting conditions without distracting the driver with a visible light source, the present invention directs an infared source at the passenger seat area. The infared emitter is mounted on a circuit board which preferably includes a processing element, memory devices that contain operational software and fault code information, interfaces to the vehicle electronic systems, and a power supply.

Embodiments of the present invention are preferably located within the interior of a vehicle, and mounted in the roof headliner or overhead console. An occupant sensing system in accordance with the present invention is located to maximize viewing of the passenger seat area and minimize potential viewing obstructions such that the passenger-side airbag deployment can be optimized depending upon certain conditions.

Other objects and aspects of the invention will become apparent to those skilled in the art from the detailed description of the invention which is presented by way of example and not as a limitation of the present invention.

DETAILED DESCRIPTION OF THE PREFERRED EMBODIMENTS

The following is a description of the best presently contemplated mode of carrying out the invention. In the accompanying drawings, like numerals designate like parts of the several figures. This description is made for the purpose of illustrating the general principles of embodiments or the invention and should not be taken in a limiting sense. The scope of the invention is determined by reference to the accompanying claims.

Figure 1:
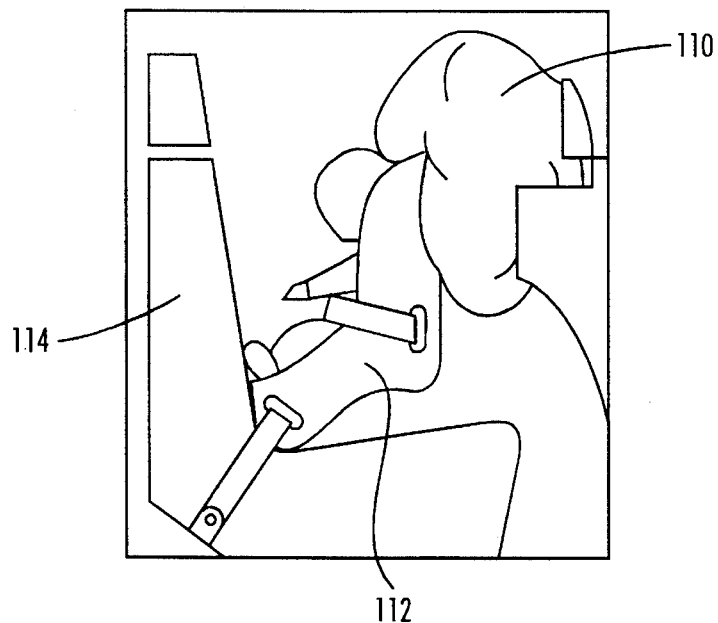
FIG. 1 depicts a typical operation of an inflatable restraint safety system in conjunction with a child carrier.
Figure 2:
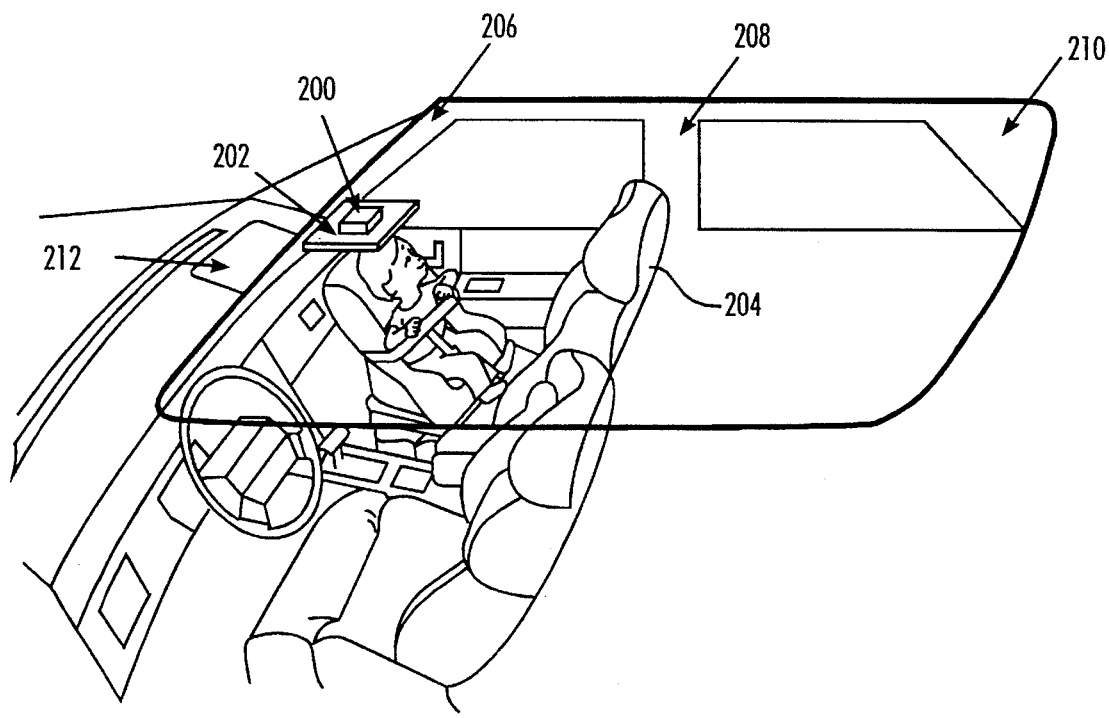
FIG. 2 shows a perspective view of an automotive occupant sensor system in accordance with a preferred embodiment of the present invention.

An automotive occupant sensor system 200 in accordance with a preferred embodiment of the present invention is shown generally in FIG. 2. Embodiments of the present invention are directed to the communication and coordination with a vehicle airbag electronic control module 212 to periodically sense the presence or absence of a forward-facing human being in the front outboard, passenger seat of the vehicle. The existence or absence of a passenger then allows the occupant sensor system to make a determination whether to enable, inhibit, or otherwise modify the initiation or deployment of a passenger-side airbag during a collision or other impact.

Preferred embodiments of the present invention perform a restraint system sensing function to control the deployment of the passenger-side airbag such that it is deployed on demand only if a forward-facing human being is present in the passenger seat. More particularly, embodiments of the invention are directed to differentiating between a child seated in a rear-facing child carrier and a forward-facing human in the passenger seat. It will be recognized that in alternate embodiments of the present invention, deployment of an air bag may be disabled only upon detection of a child sitting in a rear-facing child carrier in the passenger seat of the vehicle. In accordance with such embodiments, the airbag would deploy upon impact or collision if any forward-facing person or object is disposed in the sensor viewing area, e.g., the passenger seat. It also will be recognized that in alternate embodiments of the present invention, the relative size and position of occupants will be determined by the occupant sensing system, with the information used to optimize the initiation, rate, and inflated volume of the deployed airbag.

As shown in FIG. 2, preferred embodiments of the present invention 200 are located in the upper console 202 of the vehicle, above the driver's line of vision as well as above the passenger seat 204. Mounting embodiments of the automotive occupant sensor system in the overhead console 202 is generally preferred for supporting embodiments of the present invention to allow the features of the most of the vehicle interior seating area to be seen. The configuration of the sensor embodiments must be such that arms and objects do not block the viewing area. Accordingly, as indicated in FIG. 2, embodiments of the present invention are preferably mounted at or near the center console area 202, rear-view mirror (not shown), or pillars 206, 208, and 210, near the headliner on either the passenger or driver's side of the vehicle. It will be recognized that other mounting configurations may be used wherever the sensor embodiments are able to adequately view the interior of the vehicle, and accurately distinguish passengers and/or objects.

Figure 3:
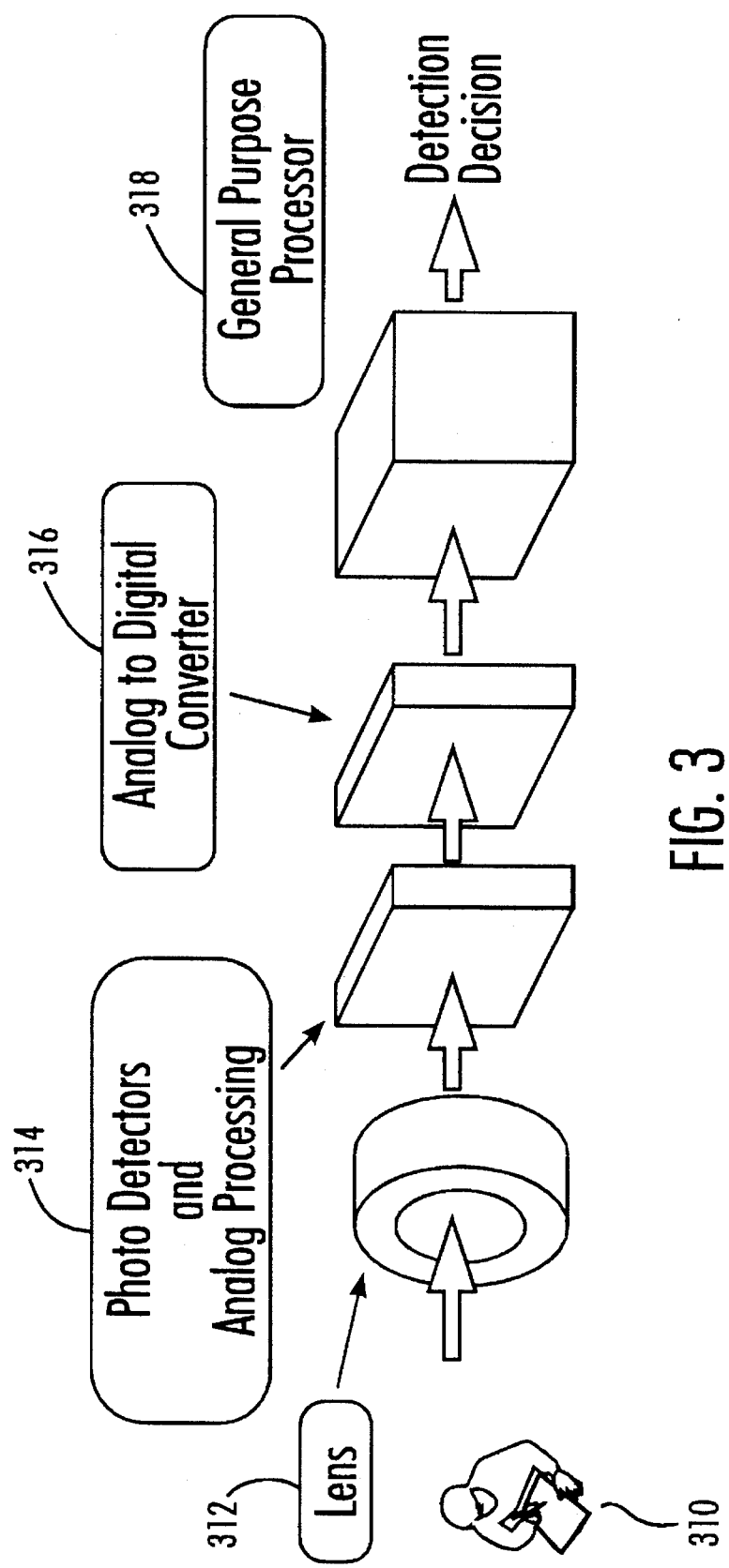
FIG. 3 shows one aspect of the sensor system in accordance with an embodiment of the invention.

The general operation of preferred embodiments of the invention is described with reference to FIG. 3. An image 310 (shown as a woman holding a book) is viewed through a lens 312. The lens 312 is provided to evenly focus the image 310 across a photodetector array 314. The photodetector 314 may include analog and or digital processing capabilities. In preferred embodiments, the interface electronics or image processing algorithms are incorporated into the sensor 314 itself or the sensor electronics, e.g., circuit board 410 of FIG. 4.

Similarly, an analog-to-digital converter 316 coupled to the output of the photodetector array 314 may be incorporated within the sensor or photodetector array 314. The output of the A/D converter 316 is input into a general purpose processor 318 which performs the image processing. Any image processing that was not accomplished by the photodetector array electronics would be performed by the processor 318, which ultimately determines whether the image of the passenger seat area represents a child seated in a rear-facing child carrier.

Figure 4:
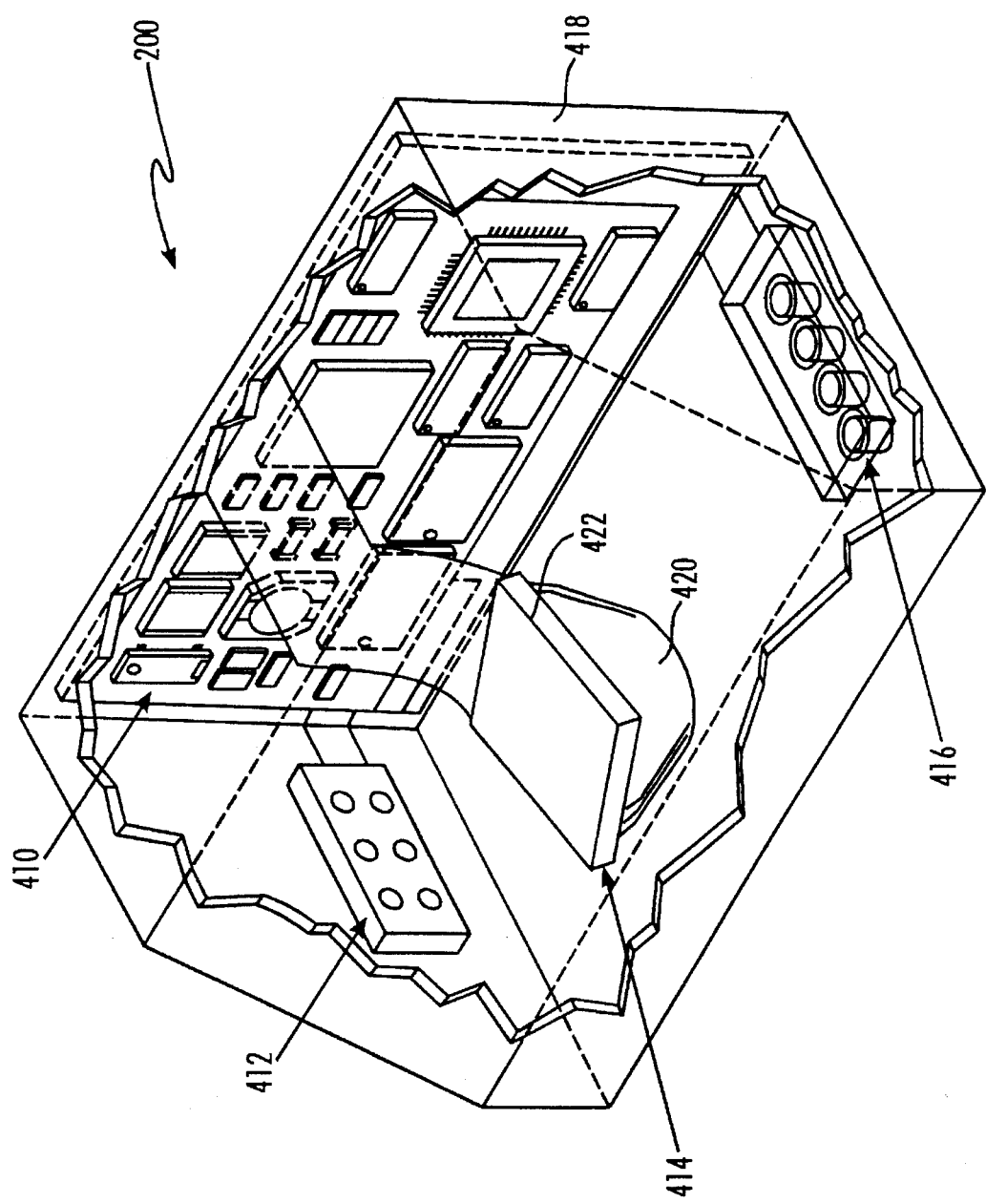
FIG. 4 shows an exploded view of the sensor arrangement of the automotive occupant sensor system embodiment of FIG. 3.

More particularly, some of the components of an embodiment of the occupant sensor module 200 are shown in FIG. 4. In the illustrated embodiment, multiple electronic components are mounted on a circuit board 410. A more detailed description of the circuit board electronics is discussed below-with reference to FIG. 7. In a preferred embodiment, the circuit board is made with integral interconnections of a flexible material allowing it to conform to restricted volume limitations for the system package. Preferably, the flexible circuit board 410, the sensor array/lens mount/lens assembly 414, and the IR source 416 are manufactured as a single unit, so that the unit can be quickly and securely attached into a housing 418 using the appropriate fasteners. The housing may be formed of plastic, metal, or composite material, which may be integral with the mounting location, or may be removable or otherwise portable.

In preferred embodiments, the housing and electronic sensor module 200 is securely and firmly mounted to the vehicle interior. The circuit board 410 is preferably installed in the housing 418 and coupled to the power source and vehicle electronics via a connector 412 which typically varies according to the vehicle manufacturer's specifications. Thus, for example, the power supply for the sensor 414 and all of the electronics on circuit board 410 can be shared with other vehicle control electronics. Preferably, the sensor 414 and circuit board 410 arrangement includes a discrete or other method of fault indication to communicate if a correct decision cannot be made by the system due, for example, to a blocked view or an internal fault. Other connection lines may include an enable/inhibit line to indicate to the airbag electronics 212 (FIG. 2) whether a forward facing passenger has been detected. The discrete indication electronics may include industry standard interfaces to provide connection to other processing electronics within the vehicle.

The sensor assembly 414 includes a lens 420, lens mount 422, and the sensor itself 510. Although in preferred embodiments, the packaging of these components may be coupled integrally in the manufacturing process, the functions performed by each component are generally separate.

For example, for low-cost, high-volume manufacturing, the sensor/lens/mounting assembly may be produced together in a single unit, e.g., an injection-molded acrylic embedded with the necessary contacts for electrical connections. By producing the lens and lens mounting integrally, manufacturing costs can be reduced by minimizing assembly variances to conform to required tolerances. Such a single unit configuration allows consistent placement and alignment of the individual components. It will be recognized, however, that a variety of other materials and substances may be used in the manufacture of the sensor, lens, and lens mounting assembly in a single unit, or as separable components.

According to embodiments of the invention, an infrared source 416 provides illumination of the vehicle interior preferably by infrared LEDs, a bulb with proper filtering, or by another lighting device which can adequately illuminate the entire sensor field of view, enabling image acquisition in the absence of visible light. The sensor 414 is sensitive to illumination in the near-infrared band which is generally not visible to humans. An infrared bandpass filter may be placed in front of the lens 420 or be integrated with the system housing 418 to limit the operation of the sensor to the near-infrared region and to obscure the internal components of the system from vehicle occupants. The sensor 414 is preferably an image based sensor and ultimately translates captured light energy into a gray scale image. For example, the sensor array and support electronics may be used to transmit a 64×64 pixel image, with each pixel being represented by one of a possible 256 gray shades to the processing components of the sensor module circuit board 410.

Figure 5:
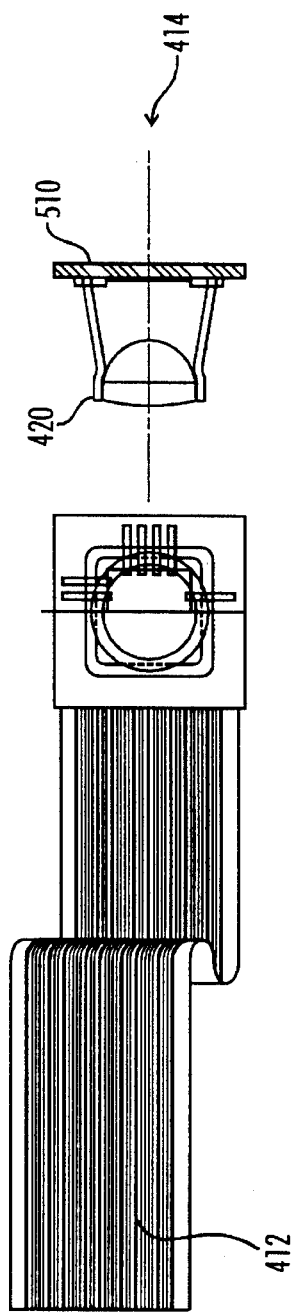
FIG. 5 shows a lens arrangement in accordance with an embodiment of the present invention.

FIG. 5 shows a more detailed side view of the sensor assembly 414 comprising a lens 420 mounted to a photodetector array/circuit board 510. A cable 512 couples the sensor to the circuit board 410 (shown in FIG. 4). In preferred embodiments, the circuit board 410, photodetector array/circuit board 510 and the interconnection cable 512 are manufactured in a flex circuit board to simplify interconnections and assembly labor. More particularly, the sensor 414 includes a photodetector array 510 which is preferably formed of multiple silicon phototransistors. The photodetector array 510 acts as a light gathering tool which may include image processing capabilities of its own. The photodetector array 510 (shown in FIG. 5) is preferably of conventional CMOS design and therefore could include the functions of other (normally separate) electronic components.

A processor 724 (shown in FIG. 7) included on the circuit board 410 analyzes the raw analog or digital image, and performs a histogram equalization to optimize the contrast between black and white. This is performed by shifting the whites whiter and blacks darker, and distributing gray shades evenly from white to black. Likely edges are then distinguished, and the angles of the edges are determined such that comparison may be made with stored templates describing the classifications of different objects, e.g., child carrier seats and empty passenger seats. Thus, since child seats will fall into a variety of different categories based on their general design, the distinguished refined edges of the image are compared to the different templates to determine if any match the characteristics of the current acquired image. When a match is found between the current image and a template, a degree of confidence is assigned to the match.

Since movement or shifting of child restraints or an empty passenger seat will be limited, changes between consecutive captured images that represent dynamic motion (once the effects of varying lighting conditions are eliminated) can be used to gain confidence in the detection of human occupants. In addition, the history of prior classifications and their associated confidence values can be constantly analyzed to improve the reliability of the current classification decision generated by the occupant sensor. Thus, if the overall confidence, or calculated accuracy, is high based upon the conclusion that the sensed image is, for example, a rear-facing child carrier, the processor will communicate this status to the airbag control electronics to inhibit the deployment of the passenger-side airbag.

Figure 6:
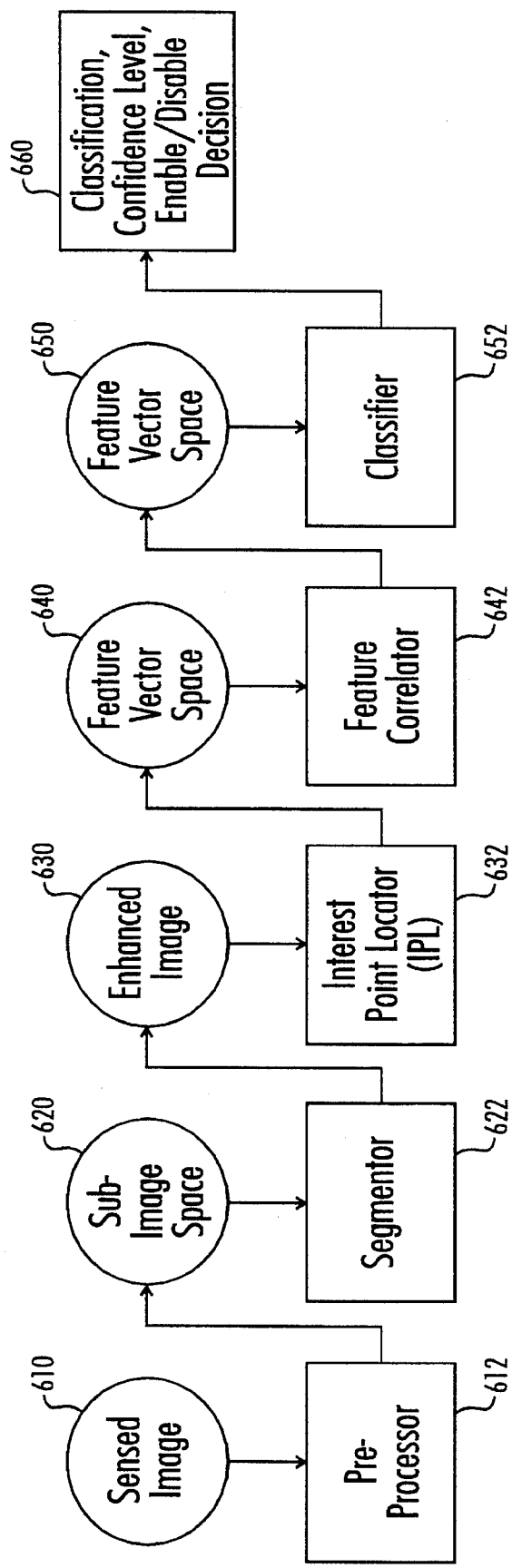
FIG. 6 is a flow diagram of the occupant sensor image processing scheme in accordance with an embodiment of the invention.

FIG. 6 describes steps for processing and classifying images viewed by the sensor according to a preferred embodiment of the present invention. A sensed input image 610 is acquired by the photodetector array. The raw sensed image 610 is then input into a preprocessor 612 which applies certain intensity mapping functions to provide enhanced details, edges, and normalize intensity which minimizes threshold adaptation in later stages. The preprocessed image 612 then becomes the sub-image space 620 which is input into a segmentor 622. The segmentor 622 includes a spoke filter which can identify regions in an image which include parts of objects, passengers, and potential "sunspots" which could lead to incorrect identification of false edges. The filter allows differentiation and clarification of unnatural edges due to things like shadows and sunlight streaming across the image space.

The output of the segmentor 622 becomes an enhanced image 630. The enhanced image is then input into an interest point locator (IPL) 632. Preferably, the IPL 632 is a Sobel edge operator which examines the image and identifies the probable essential edges of the image. The edge operator 632 also identifies the angles of the edges based upon the positions of the edge pixels of adjacent neighbors. Thus, the IPL 632 indicates whether the edges are vertical, horizontal or at 45° angles relative to the enhanced image to classify the image in accordance with stored data representing typical shapes and configurations of conventional child carriers, empty seats, and passengers.

In preferred embodiments, typical shapes and configurations for comparison are included in a template or reference library indicating the various types of objects or images to be differentiated and distinguished. For example, in preferred embodiments, the template or reference library is preferably stored in at least one memory device included in the sensor electronics on the circuit board 410 (FIG. 4). It will be recognized that a variety of filters may be implemented for the IPL 632. Both software and hardware versions of edge detection filters have been examined, and may be incorporated into embodiments of the invention to maximize the edge detection, distinction, and differentiation.

As shown in FIG. 6, the output of the edge operator which performs the functions of the IPL 632 along with the output of the spoke filter becomes the feature vector space 640. The feature vector space 640 is then input into the feature correlator 642 which tries to match the feature vector space 640 to the different stored templates, or reference library, which contains data describing idealized child carrier seat, empty seat, and passenger classifications. More particularly, the reference library includes specific descriptive information on image related characteristics of each object classification. Consequently, groups of basic characteristics describing the edge shapes of such objects can be formulated for comparison with the sensed images.

In preferred embodiments of the invention, the feature correlator 642 is capable of translating the reference library of data by shifting or rotating the templates in space to account for inaccuracies in sensor alignment within the vehicle, the range of possible passenger seat positions, improper installation of child carrier seats, and random movement of passengers. The feature correlator 642 is further capable of examining only particular segments of the templates to correlate the segments individually or as a whole with the feature vector space 640. Thus, once the acquired sensed image has been distinguished with highlighted or differentiated edges, the image can be matched with the data stored in the reference library. Because a family of child carriers has been stored in preferred embodiments, the sensor processor can adjust for movement or slight rotation of the person or object in the vehicle front passenger seat.

Following the correlation, the output of the feature correlator 642 is directed into the classifier feature vector space 650. The classifier feature vector space 650 provides a higher level of the decision-making process, and can further distinguish the sensed image in light of variations or inconsistencies in lens angle, position, and focus. The feature vector space 650 is then input into the classifier 652, which provides an enhanced function of classifying the correlated image. Unlike the feature correlator 642 in which the feature vector space 640 is compared to the different stored templates, the classifier 652 utilizes confidences assigned to each object to determine the most probable image classification.

The classifier 652 also refers to other external inputs, such as history information or apriori information. For example, after observing five images in the passenger seat of a vehicle, the sensor may determine with a 99% confidence that a child carrier seat is being observed. For the next image, it may also determine with 77% confidence that the seat is empty. Using the information that a rear facing child carrier was most likely observed in the past five images, a single empty seat indication may be questioned until more consistent and definite verification is achieved. Thus, the classifier 652 is capable of adapting its observations and determinations according to different vehicle seat positions and viewing perspectives.

The output of the classifier 652 is ultimately communicated to the vehicle electronics and possibly the driver at the decision output 660. At this point, the communication of a final decision indicating the class of the image is made. In preferred embodiments, the confidence level, in terms of percentages, is translated into an airbag enable/disable decision which is communicated to the vehicle airbag control electronics. Consequently, upon a determination, for example, that an image is a rear-facing child carrier seat, the classifier 652 effectively disables the deployment of the passenger-side airbag upon an impact.

Figure 7:
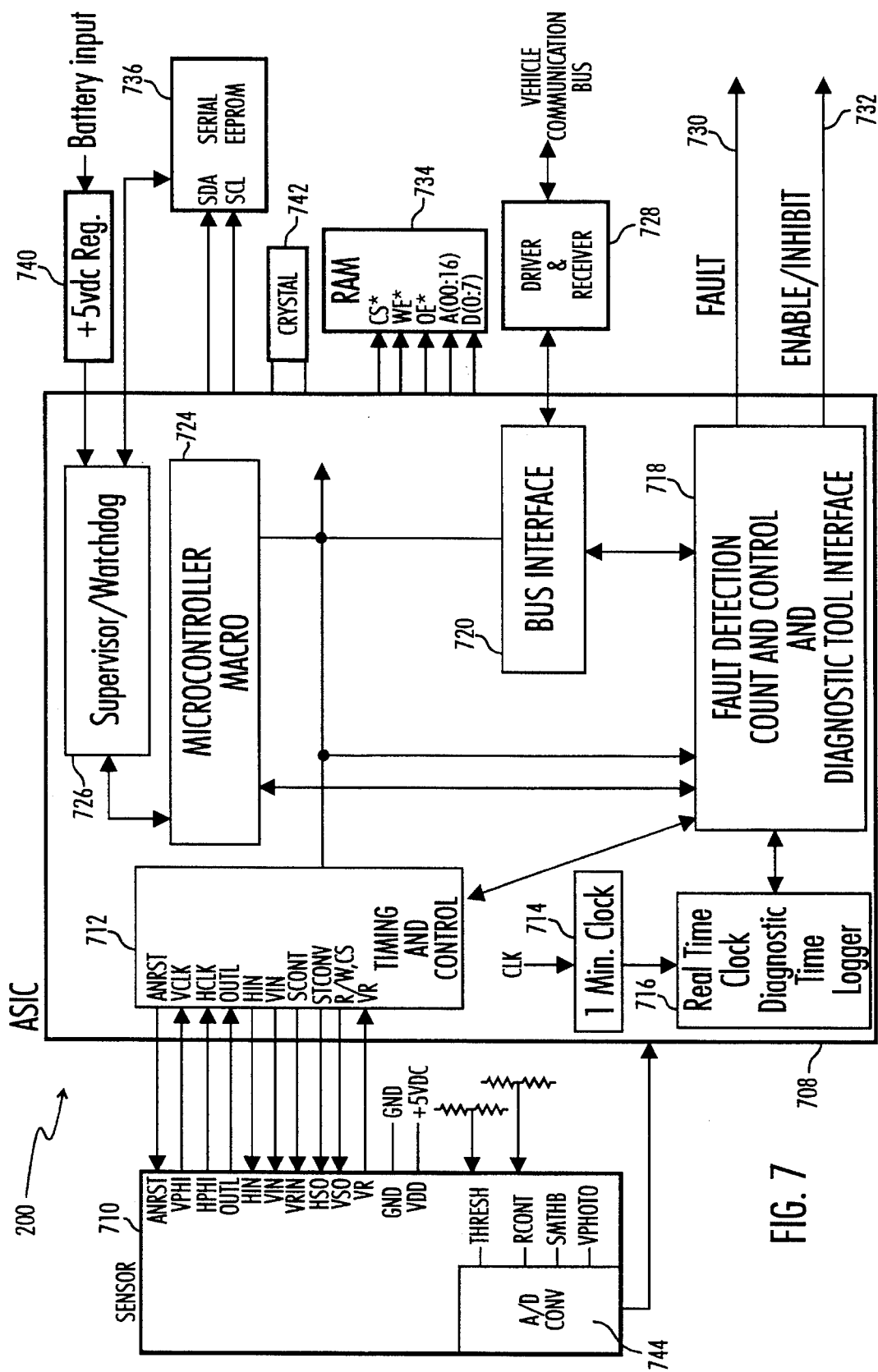
FIG. 7 is a block diagram of the occupant sensor according to a preferred embodiment of the present invention.

FIG. 7 is a detailed description of preferred embodiments of the circuit board 410 shown in FIG. 4. A sensor 710 is coupled to an application specific integrated circuit (ASIC) 708 that implements numerous functions. Part of the ASIC 708, the sensor timing and control unit 712, is provided with several lines connecting the ASIC 708 to the sensor 710. The timing and control unit 712 provides horizontal and vertical controls necessary to acquire an image from the sensor pixel by pixel, and format the image into random access memory (RAM) 734. The image data is then combined to represent a complete image.

A clock 714 is used to log time for a real time clock and diagnostic time logger (RTC/DTL) 716. The RTC/DTL 716 provides the real time of events to a fault detection and diagnostic tool interface 718. Whenever the system is operational, the fault detection circuitry 718 continuously performs a self-test diagnostic function to verify the proper operation of the system. Preferably, the diagnostic tool interface is provided by the vehicle manufacturer to diagnose problems. The diagnostic tool interface 718 represents the circuitry which accepts commands from the external diagnostic equipment provided by the vehicle manufacturer to initiate self-tests for calibration and communicate the determined status back to the diagnostic tool.

An external bus interface 720 is coupled to the fault detection and diagnostic tool interface 718. The bus interface 720 is provides communications to other on-board electronics as required by the vehicle manufacturer. For example, this would represent the electronics necessary to perform as a SAEJ1850 bus interface, if chosen by the vehicle manufacturer as the data communication interface. It will be recognized, however, that other buses or connecting devices may be utilized.

Two discrete lines extending from the fault detection and diagnostic tool interface 718 indicate whether a fault has been detected (line 730) and/or whether the airbag should be enabled or disabled (line 732). The fault line 730 signifies to the vehicle that a self-test problem has been diagnosed or that the image is not operational. The enable/inhibit line 732 communicates with the airbag electronic control module to indicate that the airbag deployment should be disabled when a rear-facing child carrier seat or empty seat condition has been detected.

The microcontroller macro 724 performs image processing on the image acquired by the sensor 710. A supervisor/watchdog timer 726 checks the system periodically to ensure that the ASIC 708 is functioning properly. In preferred embodiments, the watchdog timer 726 operates only in the key-on position, i.e., when the ignition is switched on, to reduce necessary battery power. A crystal 742 acts as the reference clock for the microcontroller 724. An automobile battery provides a nominally 12 volt DC power source that is regulated to −5 volts DC by the voltage regulator 740 for use by the occupant sensor electronics. The regulated +5 volt DC is supplied to the watchdog timer 726 as well as an EEPROM 736. The EEPROM 736 stores fault code information provided to the vehicle electronics that monitor status. RAM 734 may be a separate device or included in the ASIC 708 if sufficient capacity exists.

Although in preferred embodiments of the invention, the ASIC 708 includes the several components as discussed above and illustrated in FIG. 7, it will be recognized that the various components. e.g., the clock, interfaces, microcontroller, may be coupled together as discrete components.

Figure 8:
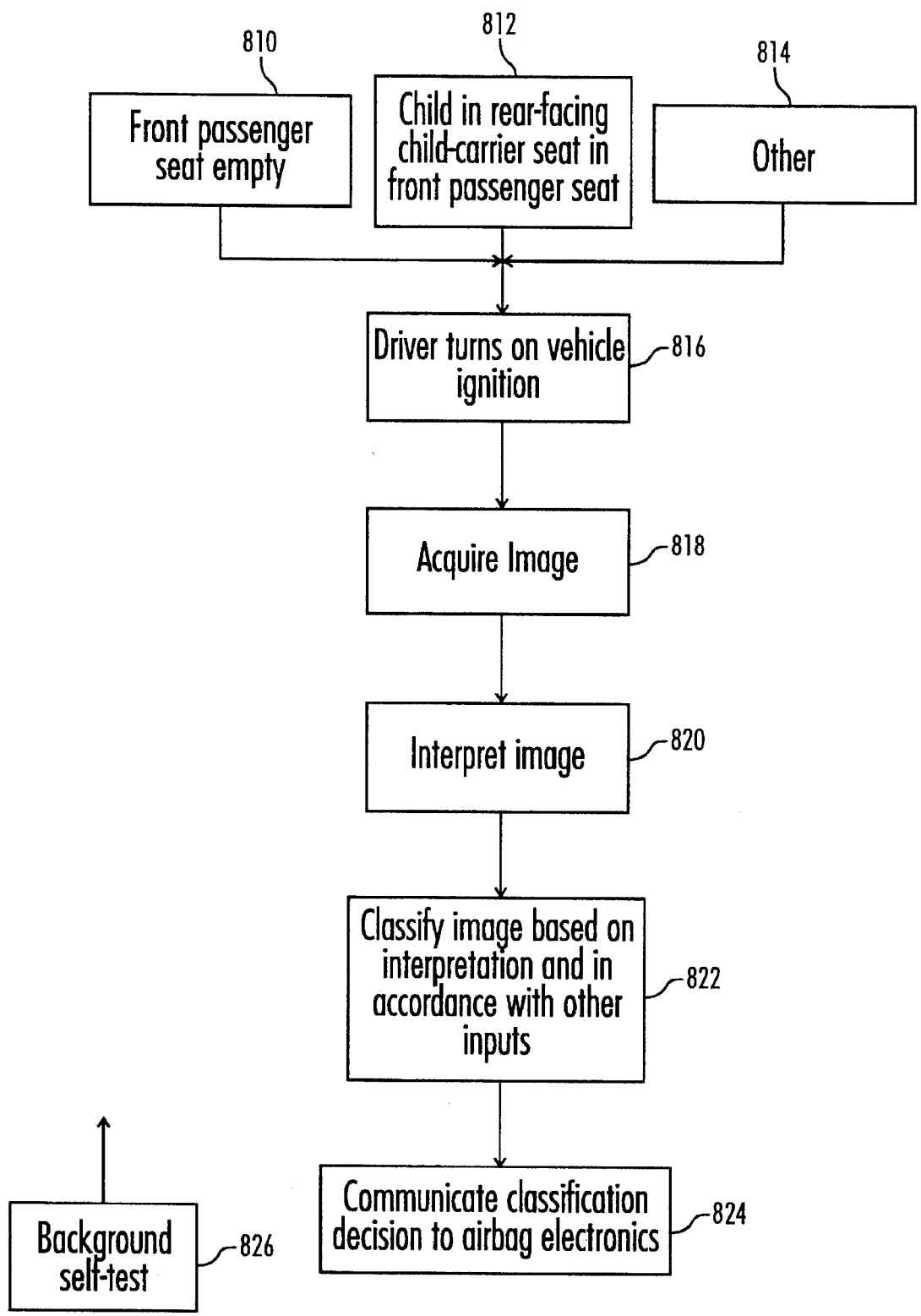
FIG. 8 is a flow diagram of the general operation of the automotive occupant sensor system in accordance with an embodiment of the invention.

FIG. 8 is a flow diagram of the operation of a preferred embodiment of the present invention. Typically, three scenarios are possible. In the first scenario, the front passenger seat is empty 810. Second, there is a rear-facing child carrier seat in the front passenger seat area 812. In the third scenario 814, all other seating arrangements are represented, e.g., forward facing passengers, child seats, and other objects. In general, if scenarios 810 and 812 are observed, the passenger side airbag will be disabled. In any other expected case 814, the airbag would be enabled.

In operation, when the driver of the vehicle turns on the ignition (Step 816), the decision-making process begins; at which time, the sensor initially acquires the image. The image will be in one of the three potential scenarios 810, 812, or 814. Sensor embodiments of the present invention then interpret and classify (step 820) the image according to the process described with reference to FIG. 6. Steps 818 through 822 are repeated as rapidly as possible, the duration of each frame being a function of the software performed and the processing capability of the occupant sensor.

Based upon the classification result of the particular frame or image, and considering any other inputs or additional stored information, it is determined whether the airbag should be enabled or disabled. Additional information may include inputs from other types of sensors. For example, dashboard-mounted ultrasonic sensors, a seat pressure sensor, or a seatbelt latch-sensing switch, among others, could be integrated. In addition, other inputs may include the past history of the most recent 5-10 decisions, as well as the confidence factors which may be associated with the earlier classifications. Accordingly, based on the information obtained and input, a decision of the current status of the passenger seat area can be made. The preferred embodiments of the present invention then communicate the decision whether to enable or disable airbag deployment to the vehicle airbag electronics (212 in FIG. 2).

Concurrent with the image processing, preferred embodiments of the present invention include a self-checking routine to verify continuous proper and reliable operation. The self-tests may include electronics checks, or basic image collection verification in which periodic checks of certain background features, or analysis of a histogram of pixel intensity is performed.

In accordance with embodiments of the present invention, the preferred mounting location is in the overhead console of the vehicle interior headliner. Depending upon the vehicle configuration, alternate mounting locations may be preferable for more advantageous sensor viewing or for security-related concerns. As indicated in FIG. 2, pillars A, B, and C, 206, 208, and 210 respectively on either the passenger or driver's side of the vehicle, may be used for mounting the sensing module 200. In addition, it will be recognized that other arrangements may be implemented. For example, sensor embodiments may be included within the vehicle's dome light structure, rear-view mirror or sun visors.

It will be recognized that embodiments of the invention may be applied to other image identification purposes. For example, an alternate embodiment of the invention may be used to sense the presence of an intruder or an intruder's arm reaching into the vehicle. Such applications could be particularly useful in certain types of vehicles, such as convertibles or trucks. Because sensor embodiments for use in a security system preferably provide for a wide-angle view of the entire interior volume of the vehicle, more exact and specific image discrimination would most likely not be necessary. Thus, image identification with reduced sensitivity could be implemented to avoid inadvertent detection of shadows or other untargeted movement.

This detailed description is set forth only for purposes of illustrating examples of the present invention and should not be considered to limit the scope thereof in any way. Clearly numerous additions, substitutions, and other modifications can be made to the invention without departing from the scope of the invention which is defined in the appended claims and equivalents thereof.

What is claimed is:

1. A vehicle sensor system for sensing the presence of an object in the interior of a vehicle and classifying an image of the object, wherein the object is associated with reflected light energy, comprising:

image classification information representing potential images and features of the object;

storage means for storing the image classification information;

an image sensor for viewing the interior of the vehicle, the image sensor including:
      a lens for viewing and focusing the image of the object, and
      a photodetector array for acquiring the image of the object, and for detecting the reflected light energy associated with the object, further wherein the reflected light energy is represented as raw analog image signals;

an analog-to-digital converter for receiving the raw analog image signals, and converting the raw analog image signals into digital data representing a low resolution gray-scale outline of the image of the object; and a processor for analyzing the digital data and for distinguishing the gray-scale outline of the image represented by the digital data, wherein the processor includes
      comparison means for comparing the distinguished outline of the image of the object with the stored classification information, wherein if the outline of the image of the object matches one of the stored potential images and features, the processor determines that the outline of the image represents the stored potential image.

2. The vehicle sensor system of claim 1, wherein the photodetector array comprises a plurality of phototransistors.

3. The vehicle sensor system of claim 1, wherein the photodetector array comprises at least one charge coupled device.

4. The vehicle sensor system of claim 1, wherein the vehicle is equipped with a passenger seat carrying a rear-facing child carrier and a passenger-side airbag, further wherein a plurality of potential images of rear-facing child carriers is stored in the storage means, such that if the processor determines that the outline of the image of the object in the passenger seat matches one of the potential images of rear-facing child carders, the processor causes the passenger-side airbag to be disabled.

5. The vehicle sensor system of claim 1, further comprising illumination means for illuminating the interior of the vehicle.

6. The vehicle sensor system of claim 5, wherein the illumination means comprises at least one light emitting diode.

7. The vehicle sensor system of claim 5, wherein the illumination means comprises at least one filtered bulb.

8. The vehicle sensor system of claim 1, wherein the storage means, the image sensor, the analog-to-digital converter, and the processor are coupled together on a circuit board.

9. The vehicle sensor of claim 8, wherein the circuit board is flexible to fit into a variety of configurations.

10. The vehicle sensor of claim 1, wherein the image sensor is mounted in the interior of the vehicle.

11. The vehicle sensor of claim 1, wherein the interior of the vehicle has an overhead console, such that the image sensor is mounted to the overhead console.

12. A safety system for enhancing the safety of a passenger seated in a passenger seat of a vehicle having a passenger-side airbag controlled by airbag electronics, the safety system for disabling the passenger-side airbag if an image representing a child seated in a rear-facing child carrier seat is identified, the system comprising:

a storage device for storing templates of data representing a plurality of seating arrangements in the vehicle, wherein at least one of the templates defines a child seated in a rear-facing child carrier seat;

a sensor for viewing the passenger seat of the vehicle, the sensor including:
   a lens for focusing the image of the passenger, the passenger having associated reflected light energy,
   a photodetector array for detecting and measuring the reflected light energy of the passenger, the photodetector array providing output gray-scale image signals; and
a processor for comparing the output gray-scale image signals with the stored templates of data to identify whether the output gray-scale image signals correlate with one of the plurality of seating arrangements represented by the stored templates, wherein if a child seated in a rear-facing child carrier seat is identified, the processor communicates with the airbag electronics to disable the passenger-side airbag.

13. The safety system of claim 12, wherein the processor comprises:
   means for identifying weak and false edges of the output image signals;
   means for segregating the weak and false edges from the output image signals to define an enhanced image;
   means for filtering the enhanced image to disregard false edges and weak edges; and
   means for modifying the identification of the passenger according to the filtered enhanced image.

14. The safety system of claim 13, further comprising a self-testing system for continuously testing the proper operation of the sensor and processor functions.

15. A method of classifying an image of an object in a vehicle observed by a sensor, the method comprising the steps of:
   storing classification data representing conventional configurations of the observed image in a reference library;
   acquiring a gray scale input image of the object observed in the vehicle;
   distinguishing details and edges of the gray scale input image;
   identifying potential false edges of the gray scale input image to differentiate unnatural edges obstructing the gray scale input image;
   segregating the false edges from the gray scale input image to define an enhanced image;
   determining angles of the edges of the enhanced image to identify high-probability edges and weak edges;
   filtering the enhanced image to disregard false edges and weak edges, the filtered enhanced image defining a feature vector space;
   correlating the feature vector space with the stored classification data in the reference library; and
   classifying the correlated feature vector space according to a match between the feature vector space and the reference library.

16. The method of claim 15, further comprising the steps of:
   performing all of the steps of claim 15 multiple times;
   storing the classified correlated feature vector space values as history data;
   comparing the most recently classified correlated feature vector space with the history data; and
   modifying the classified correlated feature vector space according to the comparison with the history data.

17. The method of claim 15, wherein the image observed by the sensor represents an occupant seated in the passenger seat of a vehicle having a passenger-side airbag which is deployed by an airbag electronics system, and further comprising the steps of:
   classifying the correlated feature vector space as a child seated in a rear-facing child carrier, the classified correlated feature vector space defining a classified image; and
   communicating to the airbag electronics system to disable passenger-side airbag.

18. A method of identifying an image in a passenger seat of a vehicle equipped with a passenger-side airbag, the method comprising the steps of:
   storing classification data representing at least three possible seating arrangements of the image, the at least three possible seating arrangements including an empty passenger seat, a child seated in a rear-facing child carrier in the passenger seat, and a forward-facing occupant, the classification data being stored in a reference library;
   observing the image, wherein the image is observed for a plurality of flames defined by predetermined periods of time;
   acquiring the plurality of frames of the observed image;
   interpreting the acquired frames of the image by
      distinguishing details and edges of the observed image,
      segregating weak and false edges of the observed image, and
      filtering the weak and false edges from the observed image;
   comparing the filtered observed image with the stored classification data to determine whether the filtered observed image matches one of the at least three possible seating arrangements; and
   classifying the filtered observed image within one of the at least three possible seating arrangements, wherein
   if the passenger seat is determined to be empty, the passenger-side airbag is disabled,
   if a child seated in a rear-facing child carrier is determined to be in the passenger seat, the passenger-side airbag is disabled, and
   if a forward-facing occupant is determined to be seated in the passenger seat, the passenger-side airbag is enabled.

19. The method of claim 18, further comprising the steps of:
   storing a plurality of previous frames of the observed image as history data;
   comparing a most recent classified image with the history data; and
   modifying the classified image according to the history data.

* * * * *